(12) United States Patent
Choi et al.

(10) Patent No.: US 10,066,714 B2
(45) Date of Patent: Sep. 4, 2018

(54) DRIVE APPARATUS OF CHAIR ASSEMBLY FOR 4D THEATER

(71) Applicant: CJ 4DPLEX CO., LTD, Seoul (KR)

(72) Inventors: Jong Su Choi, Seoul (KR); Tae Young Ku, Goyang-si (KR); Min Jong Kim, Incheon (KR)

(73) Assignee: CJ 4DPLEX CO., LTD, Seoul (KR)

( * ) Notice: Subject to any disclaimer, the term of this patent is extended or adjusted under 35 U.S.C. 154(b) by 35 days.

(21) Appl. No.: 15/107,306

(22) PCT Filed: Dec. 23, 2014

(86) PCT No.: PCT/KR2014/012687
§ 371 (c)(1),
(2) Date: Jun. 22, 2016

(87) PCT Pub. No.: WO2015/099391
PCT Pub. Date: Jul. 2, 2015

(65) Prior Publication Data
US 2017/0009856 A1    Jan. 12, 2017

(30) Foreign Application Priority Data
Dec. 23, 2013 (KR) .................. 10-2013-0161563

(51) Int. Cl.
*G09B 9/02* (2006.01)
*F16H 21/50* (2006.01)
(Continued)

(52) U.S. Cl.
CPC .............. *F16H 21/50* (2013.01); *A47C 1/12* (2013.01); *A47C 3/02* (2013.01); *A47C 15/004* (2013.01);
(Continued)

(58) Field of Classification Search
CPC .............. A63G 31/16; G09B 9/14; G09B 9/12
See application file for complete search history.

(56) References Cited

U.S. PATENT DOCUMENTS

| | | | | |
|---|---|---|---|---|
| 3,304,628 A | * | 2/1967 | Kaplan | G09B 9/14 434/58 |
| 5,597,359 A | * | 1/1997 | Byerly | A63G 31/16 434/55 |

(Continued)

FOREIGN PATENT DOCUMENTS

| | | |
|---|---|---|
| CN | 103244801 A | 8/2013 |
| JP | 07-293552 A | 11/1995 |

(Continued)

OTHER PUBLICATIONS

International Search Report for PCT/KR2014/012687 dated Feb. 13, 2015.

(Continued)

*Primary Examiner* — Bradley Duckworth
(74) *Attorney, Agent, or Firm* — Sughrue Mion, PLLC

(57) ABSTRACT

A drive apparatus of a chair assembly for a 4D theater according to the present disclosure includes: a lower plate which is in contact with the ground; an upper plate which is positioned above the lower plate so as to be spaced apart from the lower plate; a first actuator which is positioned at a left portion between the lower plate and the upper plate; a second actuator which is positioned at a right portion between the lower plate and the upper plate; and a spline device, in which the spline device is installed to be positioned on a vertical centerline of the lower plate, and the first actuator is installed to have a predetermined first angle with respect to a horizontal centerline of the lower plate.

9 Claims, 6 Drawing Sheets

(51) Int. Cl.
  *A47C 1/12*  (2006.01)
  *A47C 3/02*  (2006.01)
  *A63J 5/00*  (2006.01)
  *A63J 25/00*  (2009.01)
  *A63G 31/16*  (2006.01)
  *A47C 15/00*  (2006.01)
  *G05G 9/047*  (2006.01)

(52) U.S. Cl.
  CPC ................ *A63G 31/16* (2013.01); *A63J 5/00* (2013.01); *A63J 25/00* (2013.01); *G05G 9/047* (2013.01); *A63J 2005/002* (2013.01)

(56) References Cited

U.S. PATENT DOCUMENTS

| | | | | |
|---|---|---|---|---|
| 5,688,179 | A * | 11/1997 | Ohishi | A63F 13/08 434/55 |
| 5,772,513 | A * | 6/1998 | Ohishi | A63F 13/08 434/55 |
| 5,947,740 | A * | 9/1999 | Kim | G09B 9/14 434/29 |
| 6,027,342 | A * | 2/2000 | Brown | G09B 9/14 434/55 |
| 6,162,058 | A * | 12/2000 | Yang | A63G 31/16 434/29 |
| 6,586,854 | B1 * | 7/2003 | Nozawa | G09B 9/04 310/83 |
| 6,634,885 | B2 * | 10/2003 | Hodgetts | G09B 9/12 434/29 |
| 8,298,845 | B2 * | 10/2012 | Childress | A63F 13/08 438/46 |
| 9,004,921 | B2 * | 4/2015 | Garvis | G09B 9/14 434/30 |
| 9,155,972 | B2 * | 10/2015 | Van Lookeren Campagne | A63G 31/16 |
| 9,186,590 | B2 * | 11/2015 | Lee | A63G 31/16 |
| 9,259,657 | B2 * | 2/2016 | Vatcher | A63G 31/16 |
| 9,536,446 | B2 * | 1/2017 | Vatcher | G09B 9/12 |
| 2002/0115043 | A1 * | 8/2002 | Baker | G09B 9/08 434/30 |
| 2012/0267504 | A1 * | 10/2012 | Atluri | G09B 9/12 248/419 |
| 2014/0290400 | A1 | 10/2014 | Choi | |
| 2015/0356878 | A1 * | 12/2015 | Warmerdam | G09B 9/12 73/865.6 |
| 2016/0140862 | A1 * | 5/2016 | Van Lookeren Campagne | G09B 9/14 434/55 |
| 2016/0167224 | A1 * | 6/2016 | Foster | B25J 9/123 318/601 |
| 2017/0072327 | A1 * | 3/2017 | Wach | A63G 31/16 |

FOREIGN PATENT DOCUMENTS

| | | |
|---|---|---|
| JP | 11-290556 A | 10/1999 |
| KR | 10-1005320 B1 | 1/2011 |
| KR | 10-2011-0030097 A | 3/2011 |
| KR | 20-2012-0007457 U | 10/2012 |
| KR | 10-1209854 B1 | 12/2012 |
| KR | 10-1220787 B1 | 1/2013 |
| KR | 20-0469149 Y1 | 10/2013 |
| WO | 2013/115539 A1 | 8/2013 |

OTHER PUBLICATIONS

Communication from the Japanese Patent Office dated Aug. 24, 2017 in counterpart Japanese Patent Application No. 2016-542212.
Communication dated Feb. 7, 2018, issued by the Chinese Patent Office in counterpart Chinese Application No. 201480070362.6.

* cited by examiner

[Figure 1]
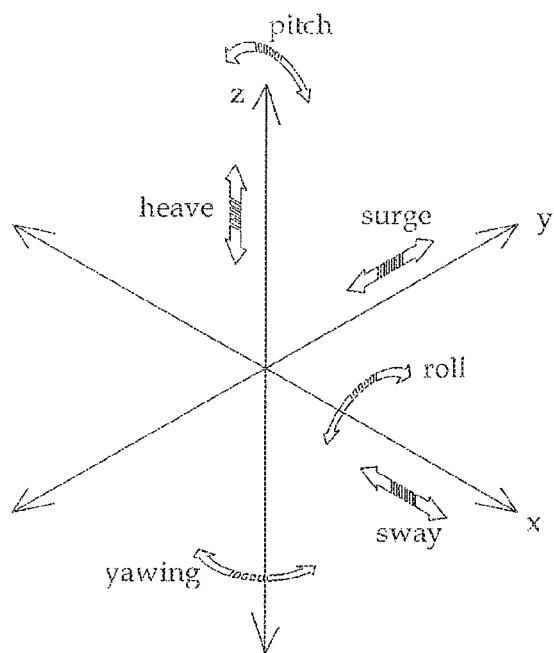
[Figure 2]
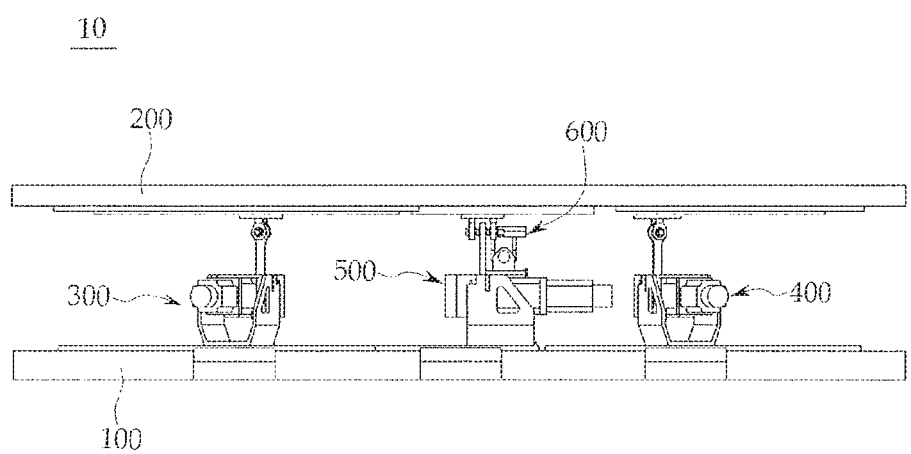

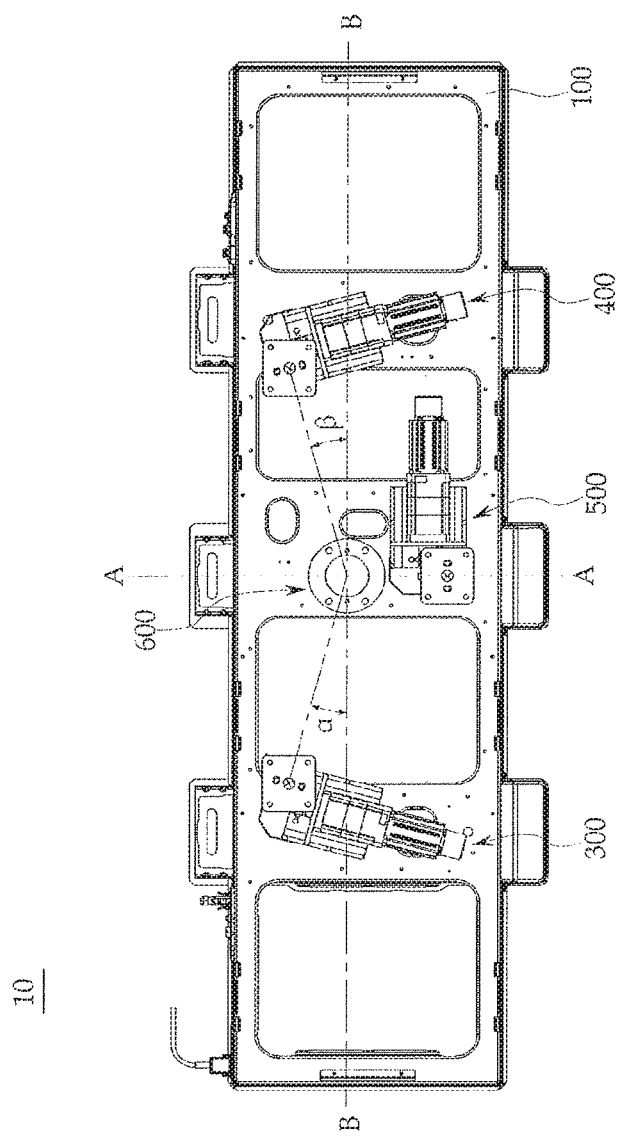
[Figure 4]

[Figure 5]
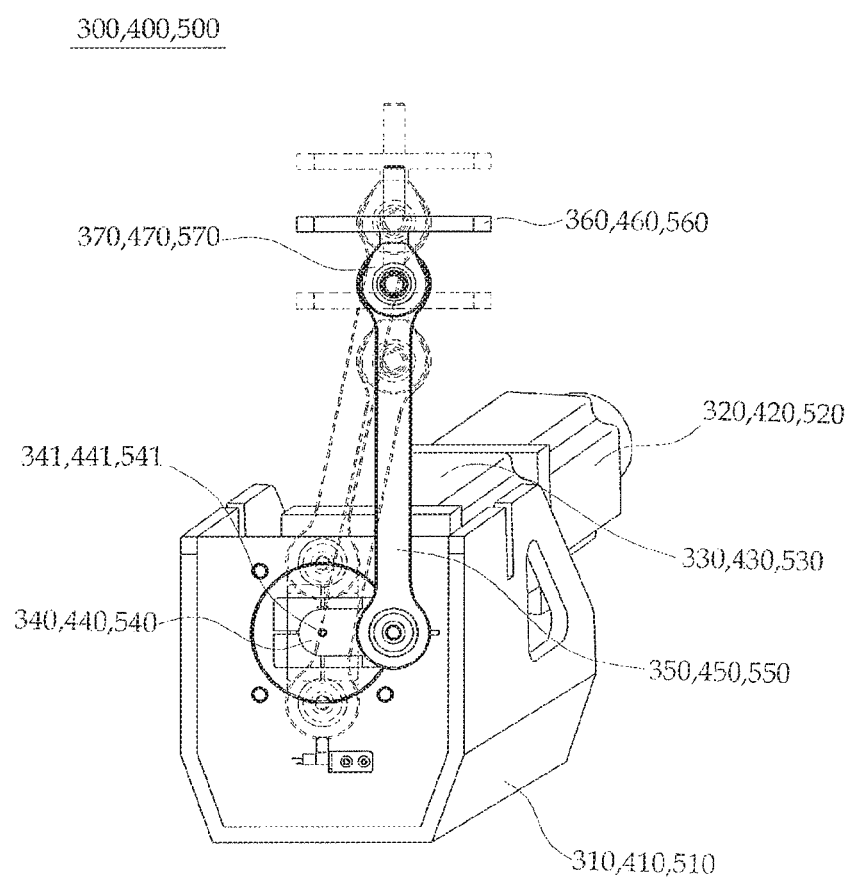

[Figure 6]
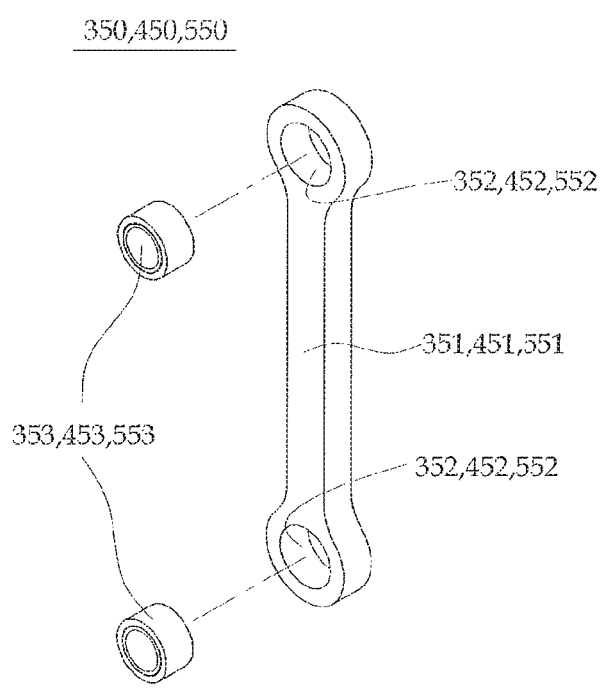

[Figure 7]
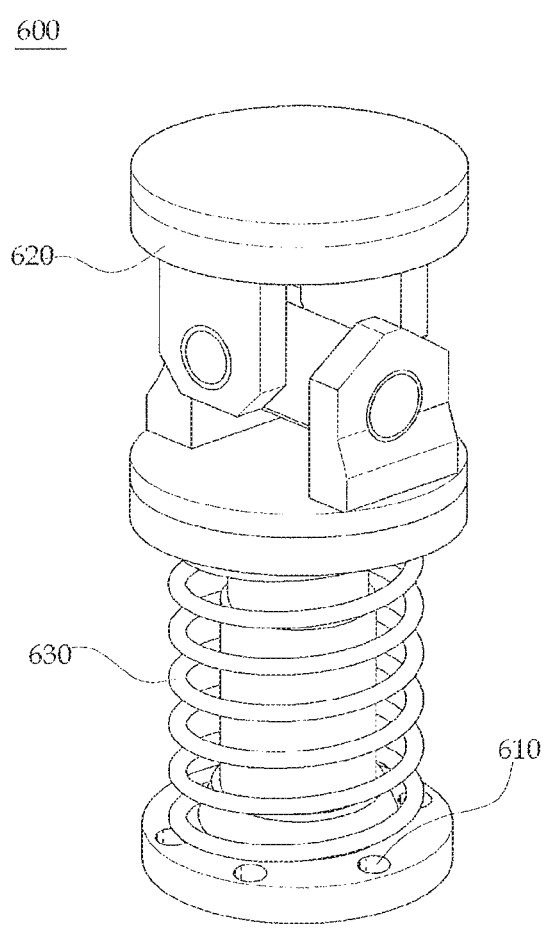

DRIVE APPARATUS OF CHAIR ASSEMBLY FOR 4D THEATER

TECHNICAL FIELD

The present disclosure relates to a drive apparatus of a chair assembly for a 4D theater which may prevent vibration or noise due to a load disturbance, which is finally caused by a component of force in a Y-axis direction which is generated during a process in which rotational motion is converted into rectilinear motion when the chair assembly for a 4D theater is operated, by a first actuator, which is installed to have a first angle with respect to a horizontal centerline of a lower plate, and a second actuator which is installed to have a second angle with respect to the horizontal centerline of the lower plate.

BACKGROUND ART

An object such as an airplane or a ship implements motion with six degrees of freedom. As illustrated in FIG. 1, the motion with six degrees of freedom refers to six virtual motions including a yawing motion which is rotation about a z-axis, a rolling motion which is left and right rotation of a y-axis about an x-axis, a pitching motion which is up and down rotation of the z-axis about the y-axis, a heaving motion which is rectilinear reciprocating movement on the z-axis, a surging motion which is rectilinear reciprocating movement on the y-axis, and a swaying motion which is rectilinear reciprocating movement on the x-axis.

A drive apparatus, which implements motion with a degree of freedom by an operation of a hydraulic actuator, has been initially developed for military use for the purpose of flight training. However, with the development of scientific technology, and computer graphic technologies, the drive apparatus has been gradually developed as a private training device for railway and marine use as well as for military use.

Further, the drive apparatus is also used for a driver of special construction equipment such as a bulldozer or a crane, in conjunction with a system which shows peripheral images that are varied in real time so as to implement a driving simulation when it is difficult for the driver to be actually trained because of a problem about safety, costs, and the like.

Recently, as quality of human lives has been improved and leisure time has been increased, the drive apparatus has been used for entertainment such as amusement parks, game simulators, and 3D movie theaters as well as for military use or training.

A movie screening facility in the related art such as a general movie theater simply provides movies to spectators, but recently, due to propagation of digital media capable of performing bidirectional signal communication and development of movie industries, new types of movies are provided, and various effects are provided to the spectator in addition to movie screening. That is, the general movie theater in the related art is a place which simply allows people to see the movies visually and auditory, but recently, the movie theater becomes a place that allows people to see the movie not only visually, but also allows people to directly feel other various sensory effects.

In general, the movie theater where people may feel stereoscopic effects of the movies visually while seeing the movies, which are specially made, is generally called a '3D movie theater', and other than the 3D movie theater, a movie theater, which allows people to feel five sensory senses such as tactile sense, olfactory sense, and the like, in addition to visual and auditory senses when seeing the movies, is referred to as a '4D movie theater'.

A drive apparatus, which is installed in a chair assembly or a chair in the movie theater, implements a degree of freedom that corresponds to situations in the movie provided to the spectators in a movie theater such as a 3D movie theater or a 4D movie theater that plays themed movies.

Korean Patent Application Laid-Open No. 10-2011-0030097 discloses the aforementioned technical spirit.

However, in the drive apparatus of the chair assembly for a 3D movie theater or a 4D movie theater in the related art, all of the actuators are installed in parallel with a horizontal centerline of a lower plate, and as a result, there is a problem in that during a process in which rotational motion is converted into rectilinear motion when the actuators are operated, a moment of force is produced about a spline device by a component of force in a Y-axis direction.

In addition, there are problems in that load disturbances such as frictional force caused by the aforementioned moment of force occur when the actuators, which constitute the drive apparatus, are operated, such that irregular noise or vibration is generated when the drive apparatus of the chair assembly is operated, thereby causing the spectator to lose an interest.

Furthermore, according to the drive apparatus of the chair assembly for a 3D movie theater or a 4D movie theater in the related art, the actuator and the plate are hingedly coupled to each other, such that a bending moment or a torsion load may be produced at a portion where the actuator and the plate are coupled to each other, and as a result, there are problems in that costs required to replace equipment may be increased due to defects at coupled portions, and in a serious case, a large-scale accident may be caused by damage to the coupled portions while the drive apparatus is in operation.

DISCLOSURE

Technical Problem

The present disclosure has been made in an effort to solve the aforementioned problem, and an object of the present disclosure is to provide a drive apparatus of a chair assembly for a 4D theater which may prevent vibration or noise due to a load disturbance, which is finally caused by a component of force in a Y-axis direction which is generated during a process in which rotational motion is converted into rectilinear motion when the chair assembly for a 4D theater is operated, by a first actuator, which is installed to have a first angle with respect to a horizontal centerline of a lower plate, and a second actuator which is installed to have a second angle with respect to the horizontal centerline of the lower plate, thereby providing a spectator with vivid motion corresponding to film screening information, and reducing time and costs required to manufacture the actuators by virtue of the actuators in which a bearing is press-fitted into and installed to a push rod.

Technical Solution

In order to achieve the object of the present disclosure, a drive apparatus of a chair assembly for a 4D theater according to the present disclosure includes: a lower plate which is in contact with the ground; an upper plate which is positioned above the lower plate so as to be spaced apart from the lower plate; a first actuator which is positioned at a left portion between the lower plate and the upper plate; a second actuator which is positioned at a right portion between the lower plate and the upper plate; and a spline device, in which the spline device is installed to be positioned on a vertical centerline of the lower plate, and the first actuator is installed to have a predetermined first angle with respect to a horizontal centerline of the lower plate.

In addition, according to another exemplary embodiment of the drive apparatus of the chair assembly for a 4D theater according to the present disclosure, the second actuator may be installed to have a predetermined second angle with respect to the horizontal centerline of the lower plate.

In addition, according to another exemplary embodiment of the drive apparatus of the chair assembly for a 4D theater according to the present disclosure, the first actuator and the second actuator may be installed so that the first angle and the second angle are equal.

In addition, according to another exemplary embodiment of the drive apparatus of the chair assembly for a 4D theater according to the present disclosure, the first angle and the second angle may be 10 degrees to 25 degrees.

In addition, according to another exemplary embodiment of the drive apparatus of the chair assembly for a 4D theater according to the present disclosure, the drive apparatus of the chair assembly for a 4D theater may further include a third actuator which is positioned at a central portion between the lower plate and the upper plate, in which the third actuator is installed to be parallel with the horizontal centerline on the same line as the vertical centerline.

In addition, according to another exemplary embodiment of the drive apparatus of the chair assembly for a 4D theater according to the present disclosure, each of the first, second, and third actuators of the drive apparatus of the chair assembly for a 4D theater may include: a supporting bracket which is fixedly installed on the lower plate; a drive motor which generates rotational driving force; a decelerator which is connected to one side of the drive motor, and reduces a rotational speed of the drive motor; a crank arm which is connected to one side of the decelerator by a ball joint; a push rod which is connected to one end of the crank arm; a fixing bracket which is fastened to a lower portion of the upper plate; and a universal joint which connects the other end of the push rod to the fixing bracket.

In addition, according to another exemplary embodiment of the drive apparatus of the chair assembly for a 4D theater according to the present disclosure, the push rod may include: a main body; insertion holes which are formed at both ends of the main body; and bearings which are fastened to the insertion holes by being press-fitted into the insertion holes.

In addition, according to another exemplary embodiment of the drive apparatus of the chair assembly for a 4D theater according to the present disclosure, a lower end of the spline device of the chair assembly for a 4D theater may be fastened to the lower plate by bolting, and an upper end of the spline device may be coupled to the lower portion of the upper plate by a universal joint.

In addition, according to another exemplary embodiment of the drive apparatus of the chair assembly for a 4D theater according to the present disclosure, the spline device may further include an elastic member which is installed around an outer circumferential surface of the spline device in order to support a load that is transmitted from the upper plate.

In addition, according to another exemplary embodiment of the drive apparatus of the chair assembly for a 4D theater according to the present disclosure, the elastic member may be a spring.

Advantageous Effects

The drive apparatus of the chair assembly for a 4D theater according to the present disclosure has the first actuator, which is installed to have the first angle with respect to the horizontal centerline of the lower plate, and the second actuator, which is installed to have a predetermined second angle with respect to the horizontal centerline of the lower plate, or the third actuator which is installed to be parallel with the horizontal centerline on the same line as the vertical centerline of the lower plate, and the first angle and the second angle are equal, thereby preventing vibration or noise from being generated due to a load disturbance that occurs at a center of the spline device when the actuators are operated.

In addition, the drive apparatus of the chair assembly for a 4D theater according to the present disclosure prevents vibration or noise from being generated due to the load disturbance when the drive apparatus is operated, thereby providing the spectator with vivid motion corresponding to film screening information, and maximizing an interest of the spectator.

Furthermore, in the actuator of the drive apparatus of the chair assembly for a 4D theater according to the present disclosure, the bearings to be installed at both ends of the push rod are fastened to the insertion holes by being press-fitted into the insertion holes, thereby reducing costs and time required to manufacture the actuator, improving productivity of the drive apparatus of the chair assembly for a 4D theater, and reducing production costs.

DESCRIPTION OF DRAWINGS

FIG. 1 is a conceptual view illustrating motion with six degrees of freedom.

FIG. 2 illustrates a front view of a drive apparatus of a chair assembly for a 4D theater according to an exemplary embodiment of the present disclosure.

FIG. 4 illustrates a top plan view of FIG. 3.

FIG. 5 illustrates a perspective view of actuators installed in the drive apparatus of the chair assembly for a 4D theater according to the exemplary embodiment of the present disclosure.

FIG. 6 illustrates a perspective view of a push rod of the actuator illustrated in FIG. 5.

FIG. 7 illustrates a perspective view of a spline device installed in the drive apparatus of the chair assembly for a 4D theater according to the exemplary embodiment of the present disclosure.

BEST MODE

Figure 3:
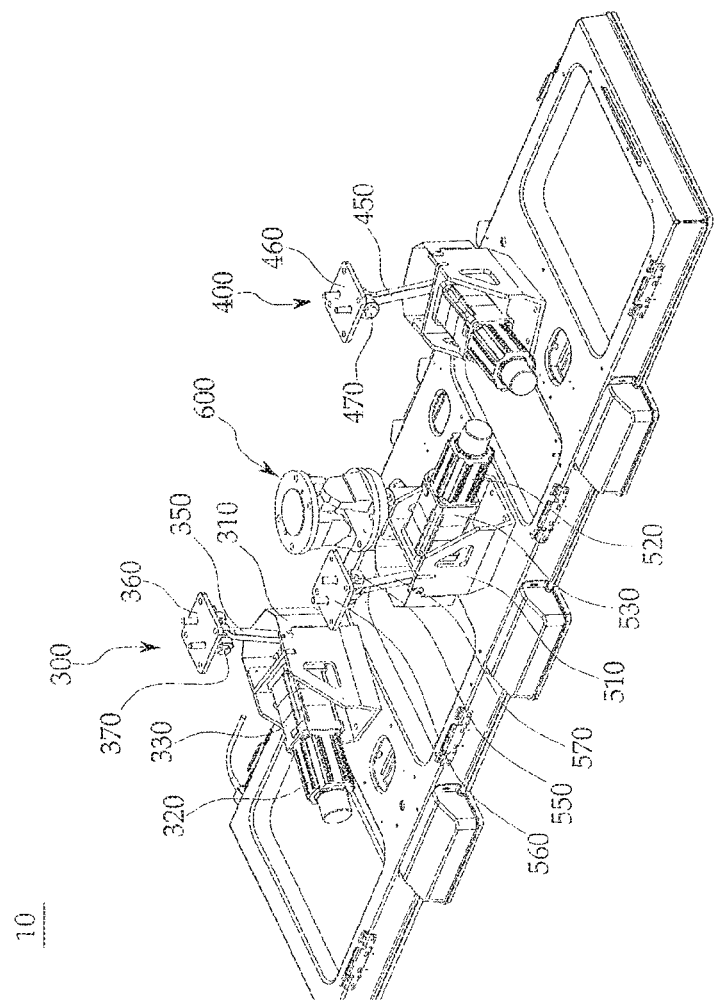
FIG. 3 illustrates a perspective view of a state in which an upper plate is removed from the drive apparatus of the chair assembly for a 4D theater which is illustrated in FIG. 2.

An exemplary embodiment of the present disclosure will be described in detail with reference to the accompanying drawings. First of all, in giving reference numerals to constituent elements in each of the drawings, like reference numerals refer to like constituent elements.

FIG. 2 illustrates a front view of a drive apparatus 10 of a chair assembly for a 4D theater according to an exemplary embodiment of the present disclosure, FIG. 3 illustrates a perspective view of a state in which an upper plate 200 is removed from the drive apparatus 10 of the chair assembly for a 4D theater which is illustrated in FIG. 2, and FIG. 4 illustrates a top plan view of FIG. 3.

The drive apparatus 10 of the chair assembly for a 4D theater according to the exemplary embodiment of the present disclosure will be described with reference to FIGS. 2 to 4. The drive apparatus 10 of the chair assembly for a 4D theater according to the exemplary embodiment of the present disclosure may include a lower plate 100, an upper plate 200, a first actuator 300, a second actuator 400, and a spline device 600.

The lower plate 100 is installed to be in contact with the ground. The lower plate 100 may be fastened to a floor structure in the 4D theater by a publicly known fastening means such as bolts or anchor bolts.

The upper plate 200 is positioned above the lower plate 100 so as to be spaced apart from the lower plate 100. Although not illustrated in the drawings, a chair may be fastened to the upper plate 200.

The first actuator 300 is installed at a left portion (at the left side in FIG. 4) between the lower plate 100 and the upper plate 200 so as to have a predetermined first angle $\alpha$ with respect to a horizontal centerline B of the lower plate 100. The first actuator 300 mainly operates the left portion of the upper plate 200.

The second actuator 400 is installed at a right portion (at the right side in FIG. 4) between the lower plate 100 and the upper plate 200. According to another exemplary embodiment of the present disclosure, the second actuator 400 may be installed to have a predetermined second angle $\beta$ with respect to the horizontal centerline B of the lower plate 100. The second actuator 400 mainly operates the right portion of the upper plate 200.

As illustrated in FIGS. 2 to 4, according to another exemplary embodiment of the present disclosure, the drive apparatus 10 of the chair assembly for a 4D theater may further include a third actuator 500.

The third actuator 500 may be installed at a central portion between the lower plate 100 and the upper plate 200 so as to be parallel with the horizontal centerline B on the same line as a vertical centerline A. The third actuator 500 mainly operates the central portion of the upper plate 200.

The spline device 600 may be installed between the lower plate 100 and the upper plate 200. That is, the spline device 600 may be installed between the first actuator 300 and the second actuator 400 so as to be positioned on the vertical centerline A of the lower plate 100.

The first actuator 300, the second actuator 400, and the third actuator 500 may be generally positioned in a triangular shape, but the present disclosure is not necessarily limited thereto. That is, as illustrated in FIGS. 2 to 4, the third actuator 500 is positioned on a vertex of the triangle, and the first actuator 300 and the second actuator 400 are positioned on the base of the triangle.

Although not illustrated in the drawings, the drive apparatus 10 of the chair assembly for a 4D theater according to the exemplary embodiment of the present disclosure may further include a fourth actuator, as necessary. The fourth actuator is installed at the central portion between the lower plate 100 and the upper plate 200 so as to be parallel with the horizontal centerline B on the same line as the vertical centerline A, and to face the third actuator 500. The fourth actuator mainly operates the central portion of the upper plate 200.

As illustrated in FIGS. 2 to 4, according to another exemplary embodiment of the present disclosure, the first actuator 300 and the second actuator 400 may be installed so that the first angle $\alpha$ and the second angle $\beta$ are equal.

In addition, according to another exemplary embodiment of the present disclosure, the first angle $\alpha$ and the second angle $\beta$ may be 10 degrees to 25 degrees. The reason is that in a case in which the first angle $\alpha$ and the second angle $\beta$ are smaller than 10 degrees or greater than 25 degrees, a component of force in a Y-axis direction is further increased, such that a greater moment of force is produced about the spline device, and as a result, a large amount of load disturbance may occur by the moment of force.

According to the exemplary embodiment of the present disclosure, the first actuator 300 and the second actuator 400 may be installed so that the first angle $\alpha$ between the horizontal centerline B of the lower plate 100 and the first actuator 300 and the second angle $\beta$ between the horizontal centerline B of the lower plate 100 and the second actuator 400 are 15 degrees. That is, the first actuator 300 and the second actuator 400 may be installed so that the first angle $\alpha$ and the second angle $\beta$ are equal, and the first angle $\alpha$ and the second angle $\beta$ are 15 degrees.

In this case, it is possible to minimize a moment of force that is produced at a center of the spline device due to the component of force in the Y-axis direction that occurs during a process in which rotational motion of push rods 350 and 450 of the first actuator 300 and the second actuator 400 is converted into rectilinear motion, and it is possible to minimize a load disturbance that occurs due to the moment of force. Since the load disturbance is minimized, it is possible to minimize irregular noise or vibration that is generated in the drive apparatus 10 of the chair assembly, thereby providing the spectator with vivid motion that corresponds to film screening information.

FIG. 5 illustrates a perspective view of the actuators 300, 400, and 500 installed in the drive apparatus 10 of the chair assembly for a 4D theater according to the exemplary embodiment of the present disclosure. As illustrated in FIG. 5, the actuators 300, 400, and 500 installed in the drive apparatus 10 of the chair assembly for a 4D theater according to the exemplary embodiment of the present disclosure may include supporting brackets 310, 410, and 510, drive motors 320, 420, and 520, decelerators 330, 430, and 530, crank arms 340, 440, and 540, push rods 350, 450, and 550, fixing brackets 360, 460, and 560, and universal joints 370, 470, and 570, respectively.

The supporting brackets 310, 410, and 510 may be fixedly installed on the lower plate 100, and the supporting brackets 310, 410, and 510 may be fixedly installed on the lower plate 100 by bolting or welding.

The drive motors 320, 420, and 520 generate rotational driving force. The drive motors 320, 420, and 520 may be a servo motor, but the present disclosure is not necessarily limited thereto.

The decelerators 330, 430, and 530 are connected to one side of the drive motors 320, 420, and 520, respectively, thereby adjusting a rotational speed of the drive motors 320, 420, and 520 to correspond to film screening information.

The crank arms 340, 440, and 540 may be connected to one side of the decelerators 330, 430, and 530 by ball joints 341, 441, and 541.

The push rods 350, 450, and 550 may be connected to one end of the crank arms 340, 440, and 540.

The fixing brackets 360, 460, and 560 may be fastened to a lower portion of the upper plate 200. The fixing brackets 360, 460, and 560 may be coupled to the lower portion of the upper plate 200 by bolting or welding, but the present disclosure is not necessarily limited thereto.

The universal joints 370, 470, and 570 connect the other end of the push rods 350, 450, and 550 to the fixing brackets 360, 460, and 560, respectively. The push rods 350, 450, and 550 and the upper plate 200 are fastened to each other by the universal joints 370, 470, and 570, such that bending stress or axial loads applied to connection portions may be minimized to increase the lifespan of the actuator and improve stability.

FIG. 6 illustrates a perspective view of the push rods 350, 450, and 550 of the actuators 300, 400, and 500 illustrated in FIG. 5. As illustrated in FIG. 6, the push rods 350, 450, and 550 of the actuators 300, 400, and 500, which are installed in the drive apparatus 10 of the chair assembly for a 4D theater according to the exemplary embodiment of the present disclosure, may include main bodies 351, 451, and 551 that define a body of the push rod.

Insertion holes 352, 452, and 552 may be formed at both sides of the main bodies 351, 451, and 551.

Bearings 353, 453, and 553 may be fastened to the insertion holes 352, 452, and 552 formed at both sides of the main bodies by being press-fitted into the insertion holes 352, 452, and 552. The bearings 353, 453, and 553 may be a sliding bearing, and the bearings 353, 453, and 553 may be press-fitted into and fastened to the insertion holes 352, 452, and 552 by a press, but the present disclosure is not necessarily limited thereto.

Rotational driving force from the drive motors 320, 420, and 520 may be converted into rotation suitable for a film screening state by the decelerators 330, 430, and 530. The rotational driving force may be converted into rectilinear motion while rotating the crank arms 340, 440, and 540 that are connected to the ball joints 341, 441, and 541. That is, the push rods 350, 450, and 550 of which one end is fastened to the crank arms 340, 440, and 540 converts rotational motion into rectilinear motion while being rotated, and transmits the converted force to the upper plate 200.

Since the sliding bearings 353, 453, and 553 are fastened to the insertion holes 352, 452, and 552 by being press-fitted into the insertion holes 352, 452, and 552, respectively, time and costs required to manufacture the push rods 350, 450, and 550 of the actuators 300, 400, and 500 may be reduced, thereby reducing time and costs required to manufacture the actuator.

FIG. 7 illustrates a perspective view of the spline device 600 installed in the drive apparatus of the chair assembly for a 4D theater according to the exemplary embodiment of the present disclosure. As illustrated in FIG. 7, according to the spline device 600 installed in the drive apparatus of the chair assembly for a 4D theater according to the exemplary embodiment of the present disclosure, a lower end of the spline device 600 may be fastened to the lower plate 100 by bolting 610, and an upper end of the spline device 600 may be coupled to the lower portion of the upper plate 200 by a universal joint 620.

In addition, as illustrated in FIG. 7, the spline device 600 installed in the drive apparatus of the chair assembly for a 4D theater according to another exemplary embodiment of the present disclosure may have an elastic member 630 which is installed around an outer circumferential surface of the spline device 600 in order to support a load that is transmitted from the upper plate 200, and the elastic member 630 may be a spring.

The spline device 600 may precisely control the drive apparatus 10 of the chair assembly for a 4D theater according to the present disclosure in accordance with contents of a movie, and may support loads applied to the first, second, and third actuators 300, 400, and 500, thereby increasing stability of the apparatus.

The present disclosure is not limited by the modifications illustrated in the drawings and the aforementioned exemplary embodiments, but may be expanded to other exemplary embodiments that belong to the scope of the appended claims.

The invention claimed is:

1. A drive apparatus of a chair assembly for a 4D theater, comprising:
   a lower plate which is in contact with the ground;
   an upper plate which is positioned above the lower plate so as to be spaced apart from the lower plate;
   a first actuator which is positioned at a left portion between the lower plate and the upper plate;
   a second actuator which is positioned at a right portion between the lower plate and the upper plate; and
   a spline device,
   wherein the first actuator is installed to have a predetermined first angle with respect to a horizontal centerline of the lower plate,
   wherein the second actuator is installed to have a predetermined second angle with respect to the horizontal centerline of the lower plate, and
   wherein each of the first angle and the second angle is 10 degrees to 25 degrees.

2. The drive apparatus of claim 1, wherein the first actuator and the second actuator are installed so that the first angle and the second angle are equal.

3. The drive apparatus of claim 1, further comprising:
   a third actuator which is positioned at a central portion between the lower plate and the upper plate,
   wherein the third actuator is installed to be parallel with the horizontal centerline on the same line as the vertical centerline.

4. The drive apparatus of claim 3, wherein each of the first, second, and third actuators includes:
   a supporting bracket which is fixedly installed on the lower plate;
   a drive motor which generates rotational driving force;
   a decelerator which is connected to one side of the drive motor, and reduces a rotational speed of the drive motor;
   a crank arm which is connected to one side of the decelerator by a ball joint;
   a push rod which is connected to one end of the crank arm;
   a fixing bracket which is fastened to a lower portion of the upper plate; and
   a universal joint which connects the other end of the push rod to the fixing bracket.

5. The drive apparatus of claim 4, wherein the push rod includes:
   a main body;
   insertion holes which are formed at both ends of the main body; and
   bearings which are fastened to the insertion holes by being press-fitted into the insertion holes.

6. The drive apparatus of claim 5, wherein a lower end of the spline device is fastened to the lower plate by bolting, and an upper end of the spline device is coupled to the lower portion of the upper plate by a universal joint.

7. The drive apparatus of claim 6, wherein the spline device further includes an elastic member which is installed around an outer circumferential surface of the spline device in order to support a load that is transmitted from the upper plate.

8. The drive apparatus of claim 7, wherein the elastic member is a spring.

9. The drive apparatus of claim 1, wherein the spline device is installed to be positioned on a vertical centerline of the lower plate.

\* \* \* \* \*